(12) United States Patent
Hildebrandt et al.

(10) Patent No.: US 10,399,320 B2
(45) Date of Patent: Sep. 3, 2019

(54) ASSEMBLING JIG FOR MOUNTING PANEL STRUCTURE ELEMENTS ONTO A SURFACE OF A CFRP PANEL

(71) Applicants: AIRBUS OPERATIONS GMBH, Hamburg (DE); PREMIUM AEROTEC GMBH, Augsburg (DE)

(72) Inventors: Christian Hildebrandt, Hamburg (DE); Marc Kolle, Hamburg (DE); Michael May, Lamerdingen (DE); Thomas Knoetig, Nordenham (DE); Olaf Wolke, Oldenburg (DE); Brian Hein, Bad Zwischenahn (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 751 days.

(21) Appl. No.: 14/785,780

(22) PCT Filed: Apr. 24, 2014

(86) PCT No.: PCT/EP2014/058364
§ 371 (c)(1),
(2) Date: Oct. 20, 2015

(87) PCT Pub. No.: WO2014/174023
PCT Pub. Date: Oct. 30, 2014

(65) Prior Publication Data
US 2016/0089871 A1    Mar. 31, 2016

(30) Foreign Application Priority Data

Apr. 25, 2013 (EP) .................................... 13165367

(51) Int. Cl.
*B32B 38/18* (2006.01)
*B64F 5/10* (2017.01)

(52) U.S. Cl.
CPC ............ *B32B 38/1833* (2013.01); *B64F 5/10* (2017.01)

(58) Field of Classification Search
CPC ................................ B64F 5/10; B32B 38/1833
See application file for complete search history.

(56) References Cited

U.S. PATENT DOCUMENTS

| 4,398,693 A | * | 8/1983 | Hahn | ..................... B29C 33/307 |
| | | | | 249/155 |
| 4,695,032 A | * | 9/1987 | Desport | ................ B29C 33/307 |
| | | | | 114/359 |

(Continued)

FOREIGN PATENT DOCUMENTS

| DE | 102010013478 A1 | 10/2011 |
| EP | 0807504 A1 | 11/1997 |
| WO | 2006070013 A1 | 7/2006 |

OTHER PUBLICATIONS

European Patent Office, European Search Report for European Patent Application No. 13165367.7 dated Oct. 7, 2013.

(Continued)

*Primary Examiner* — Michael N Orlando
*Assistant Examiner* — John Blades
(74) *Attorney, Agent, or Firm* — Lorenz & Kopf LLP

(57) ABSTRACT

Assembling jig for mounting panel structure elements onto a surface of a CFRP-panel, comprising a base frame on which several positioning boards are transversely attached, which are parallel arranged one to another for supporting the CFRP-panel on an upper mounting surface, wherein the base frame comprises at least one metal bar for coupling the positioning boards consisting of a material having a thermal expansion coefficient which corresponds to the thermal expansion coefficient of the CFRP-material of the panel in (Continued)

order to provide a tolerance compensation system in at least longitudinal direction of the base frame.

6 Claims, 1 Drawing Sheet

(56) References Cited

U.S. PATENT DOCUMENTS

| | | | |
|---|---|---|---|
| 8,088,317 B1 | 1/2012 | Karem | |
| 8,262,965 B2 * | 9/2012 | Froeschner | B29C 35/002 |
| | | | 264/219 |
| 2009/0236044 A1 * | 9/2009 | Gallana Blanco | B29C 33/307 |
| | | | 156/349 |
| 2013/0020030 A1 * | 1/2013 | Lonsdorfer | B29C 31/008 |
| | | | 156/538 |

OTHER PUBLICATIONS

Patent Cooperation Treaty, International Search Report for International Application No. PCT/EP2014/058364 dated Jul. 18, 2014.

* cited by examiner

ASSEMBLING JIG FOR MOUNTING PANEL STRUCTURE ELEMENTS ONTO A SURFACE OF A CFRP PANEL

CROSS-REFERENCE TO RELATED APPLICATIONS

This is a bypass continuation of International Application No. PCT/EP2014/058364, filed Apr. 24, 2014, which application claims priority to European Application No. 13165367.7, filed Apr. 25, 2013, which are hereby incorporated by reference in their entirety.

TECHNICAL FIELD

The embodiments relate to an assembling jig for mounting panel structure elements onto the surface of a CFRP-panel, comprising a base frame on which several positioning boards are transversally attached and parallel arranged one to another for supporting the CFRP-panel on an upper mounting surface.

BACKGROUND

The field of application of the present embodiment predominately relates to aircraft construction. In particular, wide-bodied commercial aircraft or transport aircraft can be constructed in a shell construction, in particular a semi-shell construction. In aircraft construction, the term "semi-shell construction" relates to the design of the fuselage, mostly in two shells. When jointed, the two shells result in an almost circular or oval cross-section of a fuselage segment. A plurality of fuselage segments arranged in line, for the rear end, the middle of the fuselage, and the cockpit section, form the entire aircraft fuselage. Increasingly, in the production of aircraft fuselages, suitable fiber composite materials such as carbon fiber reinforced plastics (CFRP) are used. In order to stiffen the fuselage so that it can take up the expected loads, the shells usually comprise structure elements such as stiffening members, in particular stringers and frames.

The document DE 10 2010 013 478 A1 discloses a device for manufacturing structural components, especially panels, from a fiber composite material. The fiber composite panel is produced in a negative adhesive mold in which various layers of fiber material and resin are placed and cured. In this arrangement the device interacts with a jig, which is used for preparing the layer design of the skin layers apart from positioning the structure elements, for example, in particular stringers, window frames, door frames, and the like, bonded into the layer design. Lastly the device defines the corresponding external contour and ensures a smooth external surface of the shell-like panel.

An assembling device interacts with a laminating bonding device having a corresponding shape for forming this panel under pressure, wherein the mounting surface includes a plurality of individually elastically deformable mounting shell parts arranged adjacent to each other along at least one longitudinally extending pitch line and attached to a plurality of elastically deformable supporting frame elements extending on the interior of the panel at a right angle to the pitch line, and a plurality of actuators for deforming the mounting surface between an extended position and at least one retracted position to move the assembling device from the bonding device relative to the receiving channels without undercuts. Usually, a CFRP-panel will be produced with integrated stringers. Other panel structure elements, for example frame elements, will be mounted onto the surface of the CFRP-panel later.

For mounting the remaining panel structure elements, an assembling jig is used, which holds the pre-produced panel in the desired position. Usually the assembling jig comprises several positioning boards that are parallel arranged one to another forming a mounting surface on which the panel is temporarily fastened for the further mounting process. Large CFRP-panels have tolerances in relation to the assembling jig since the CFRP-material has a different thermal expansion coefficient than the assembling jig material, which is usually made of steel.

In addition, other objects, desirable features and characteristics will become apparent from the subsequent summary and detailed description, and the appended claims, taken in conjunction with the accompanying drawings and this background.

BRIEF SUMMARY

It is an object of the present embodiment to provide a tolerance compensation system for an assembling jig in order to maintain position tolerances of large CFRP-panels with respect to the jig construction as small as possible.

An aspect of the present embodiment encompasses a technical teaching according to which the base frame of an assembling jig comprises at least one metal bar for coupling the positioning boards, wherein the metal bar consists of a material having a thermal expansion coefficient which corresponds to the thermal expansion coefficient of the CFRP-material of the panel in order to provide a tolerance compensation system in the at least large longitudinal direction x of the base frame.

The solution avoids positioning tolerance deviation between the assembling jig and the CFRP-panel at least in the direction of its largest size. For a fuselage shell, the longitudinal direction corresponds to the flight direction. It is also possible to install a tolerance compensation system in the transversally direction of the CFRP-panel, if necessary. Keeping tolerances small has advantages such as good assembly capabilities and tight design assemblies.

For example, the at least one metal bar can consist of Invar® steel material. Since the Invar® steel material has nearly the same thermal expansion coefficient like CFRP-material an effective tolerance compensation is provided. Therefore, each temperature deviation leads to elongation of the CFRP-panel and the base frame follows in the same value and its positioning boards are positioned properly.

According to a preferred embodiment, two metal bars are provided that are arranged parallel one to another for supporting the positioning boards at both end sides. For a curved CFRP-panel that is supported by the assembling jig, the positioning boards are also curved in order to fit with the CFRP-panel. In this case, the positioning boards are shaped like a bridge, and it is advantageous to support both ends of the bridge-shaped positioning boards separately. The convex upper side of the positioning boards provide a mounting surface that corresponds to the concave inner surface of the CFRP-panel.

According to another preferred embodiment, a positioning board comprises positioning means for holding panel structure elements in place for mounting at the inner surface of the CFRP-panel. Such panel structure elements comprise at least one frame element and/or at least one clip element. The clip element is provided for connecting the frame element to a pre-mounted stringer at the inner surface of the CFRP-panel. The frame element as well as the clip element may consist of CFRP- or titanium material. They are preferably attached to the stringer and the skin of the CFRP-panel, respectively, by riveting.

The clip elements are mounted in the cross-over point of the stringer and the frame element, which runs transversal to the longitudinal directed stringers in relation to the CFRP-panel.

Preferably, the base frame of the assembling jig is attached via one fixed bearing and several adjacent moveable bearings to the basement of the assembling jig in order to provide an elastic bearing solution in the longitudinal direction x of the base frame in which the metal bars are installed between each positioning board. The metal bars are preferably connected to the positioning boards which are parallel arranged one to another in a predetermined distance which corresponds to the length of the metal bar.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
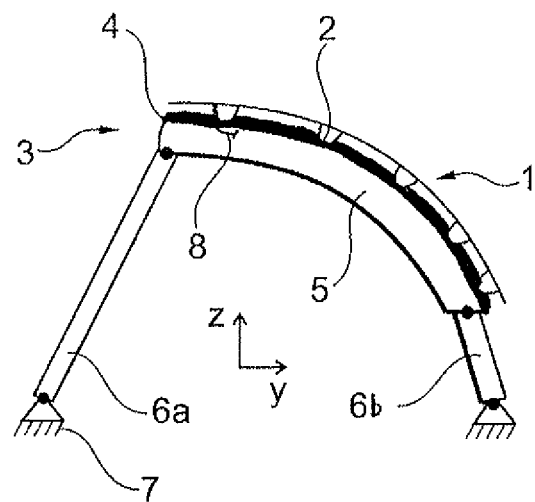
FIG. 1 is a schematical side view of an assembling jig for mounting panel structure elements onto a surface of a CFRP-panel.

According to FIG. 1, a pre-produced CFRP-panel 1 with longitudinal integrated stringers 2 at the inner surface of the CFRP-panel 1, is positioned on an upper mounting surface 3 of an assembling jig for mounting further panel structure elements, especially frame elements 4 onto the inner surface of the CFRP-panel 1 by riveting.

The upper mounting surface 3 of the assembling jig is formed by several positioning boards 5 which are parallel arranged one to another for supporting the CFRP-panel 1. Each positioning board 5 is provided with an arced shape that corresponds with the arced shape of the CFRP-panel 1 in its y direction. Both ends of the arced-shaped positioning board 5 are supported by a base frame 6a and 6b that connects the positioning boards 5 to the basement 7.

Furthermore, the positioning board 5 comprises positioning means for holding a frame element 4 in place for mounting at the inner side of the CFRP-panel 1 by riveting. Furthermore, clip elements 8 are provided for fastening the frame elements 4 to the stringers 2 on the cross-over point of both parts.

Figure 2:
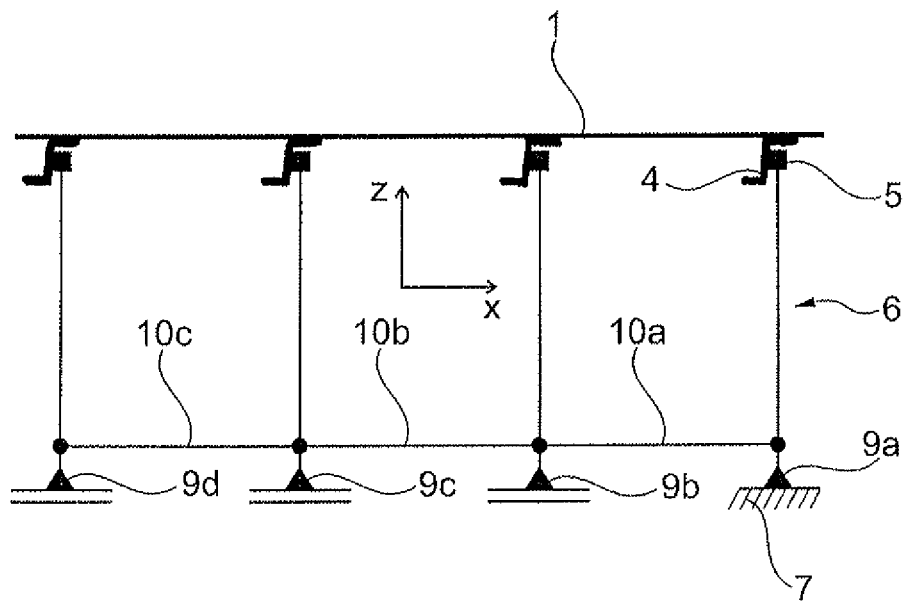
FIG. 2 is a schematical front view of the assembling jig as shown in FIG. 1.

According to FIG. 2, the base frame 6 is attached to the basement via one fixed bearing 9a at one side of the base frame 6. Furthermore, three movable bearings 9b, 9c, and 9d are provided for connecting the base frame 6 to the basement in a movable manner in x-direction in order to provide a tolerance compensation in the longitudinal direction of the CFRP-panel 1. Therefore, vertical stakes of the base frame 6 are coupled through metal bars 10a, 10b, and 10c that consist of Invar® steel material having nearly the same thermal expansion coefficient like the CFRP-material of the panel 1. The lower end side of each vertical stake of the base frame 6 is connected to one of the bearings 9a, 9b, 9c, and 9d, and the upper end side is connected to the corresponding positioning board 5 for holding the CFRP-panel 1 in place.

In addition, let it be noted that "encompass" does not preclude any other elements or steps, and "an" or "a" do not rule out a plurality. Furthermore, it is noted that the features or steps described with reference to one of the above exemplary embodiments can also be used in combination with other features or steps of other exemplary embodiments described above. References in the claims are not to be construed as a limitation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A unit comprising:
   a carbon fiber reinforced plastic (CFRP) panel having an inner surface and longitudinal stringers integrated at the inner surface of the CFRP panel; and
   an assembly jig to support the CFRP panel for connecting frame elements to the stringers, the assembly jig comprising:
   an upper mounting surface formed by a plurality of positioning boards, each of the positioning boards having an arced shape that corresponds to a shape of the CFRP panel, wherein the positioning boards support the CFRP panel;
   a basement;
   a base frame comprising a plurality of vertical stakes and a plurality of metal bars; and
   a plurality of bearings comprising a fixed bearing attaching a first end of the base frame to the basement, and a plurality of moveable bearings connecting the base frame to the basement in a moveable manner;
   wherein a lower end of each of the vertical stakes is connected to a respective one of the bearings;
   wherein an upper end of each of the vertical stakes is connected to a respective one of the positioning boards;
   wherein each of the metal bars has a coefficient of thermal expansion that corresponds to a thermal expansion coefficient of the CFRP panel; and
   wherein each of the metal bars is arranged between two of the positioning boards, each of the metal bars is coupled between two of the vertical stakes, and each of the metal bars is coupled between two of the bearings.

2. The unit according to claim 1, wherein convex sides of the positioning boards provide the upper mounting surface that corresponds with a concave inner surface of the CFRP panel.

3. The unit according to claim 1, wherein the movable bearings provide elastic tolerance compensation in a longitudinal direction of the metal bars.

4. The unit according to claim 1, wherein the metal bars are connected to the positioning boards via the vertical stakes of the base frame.

5. The unit of claim 1, further comprising a plurality of clip elements coupling the frame elements to the longitudinal stringers.

6. The unit of claim 1, wherein the plurality of positioning boards are transversely attached to the base frame and are arranged in parallel to one another.

* * * * *